Inventors,
Fred H. Bateman,
Isaac Trolley,
by their Attorneys
Howson & Howson

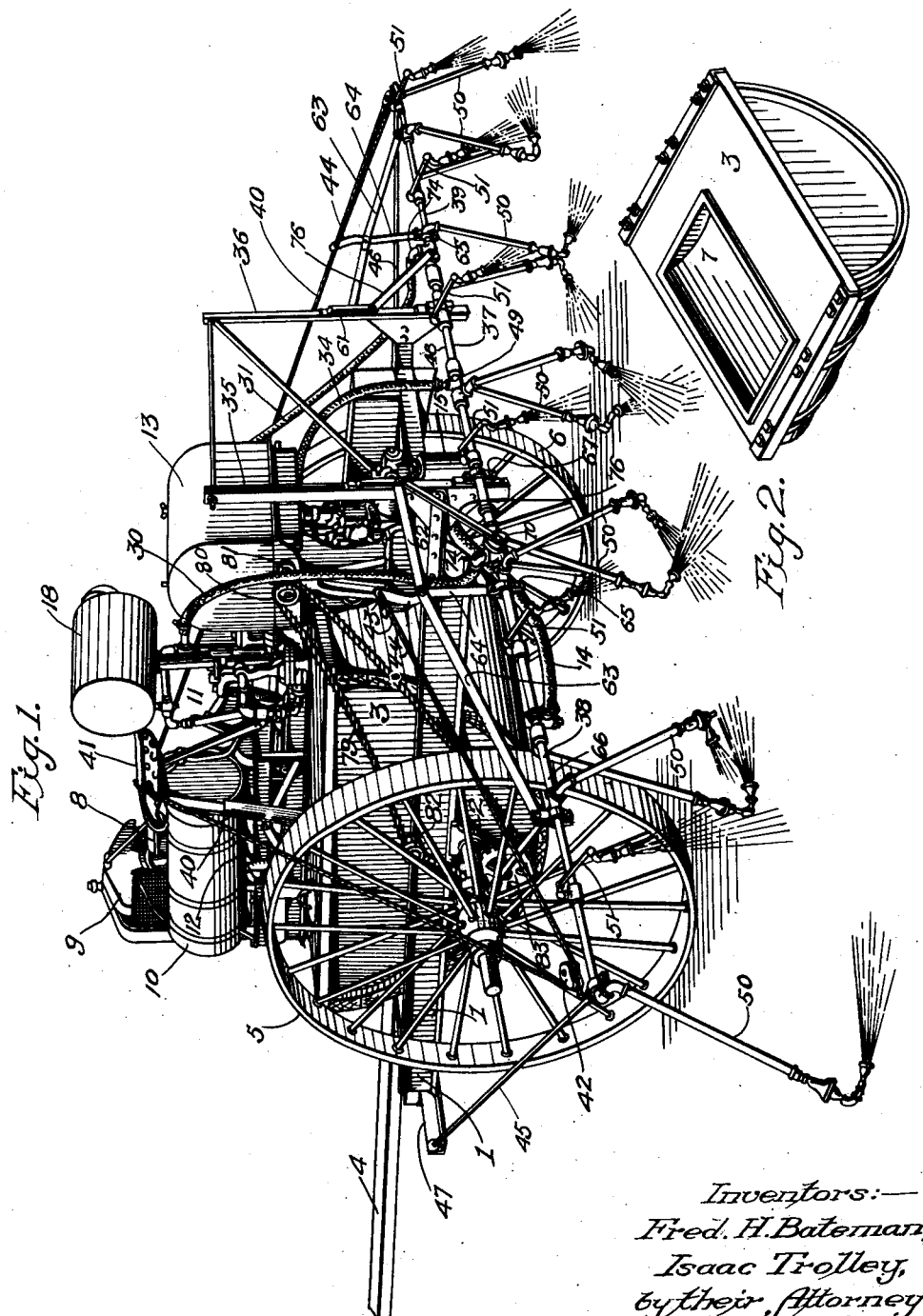

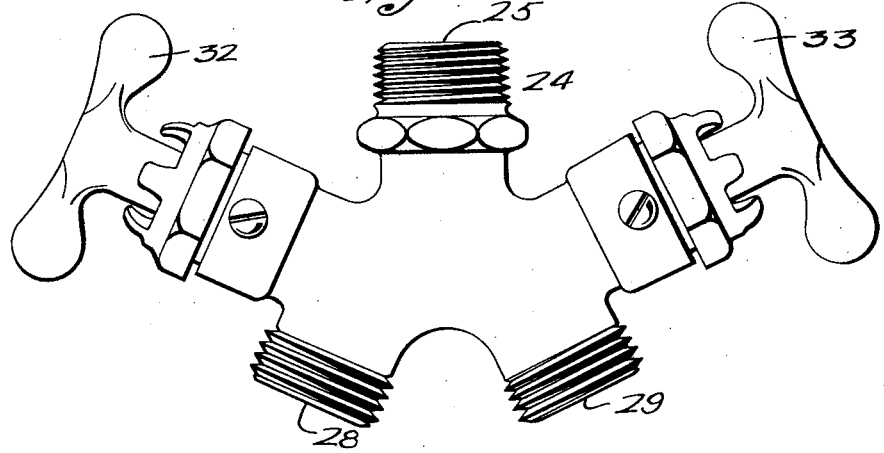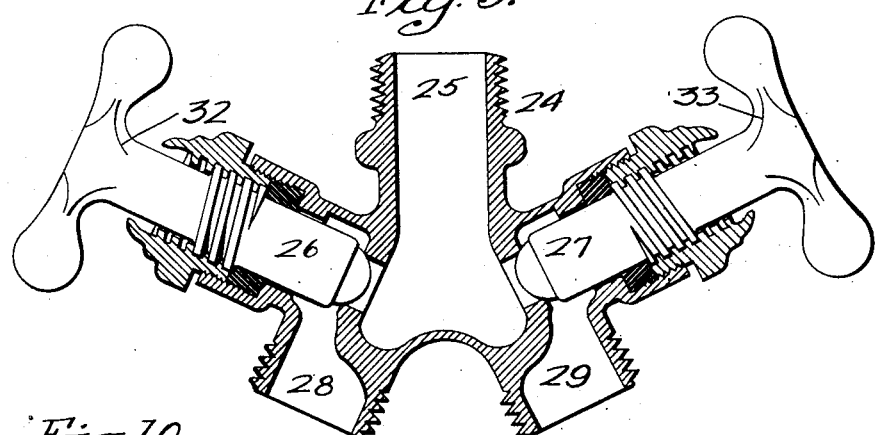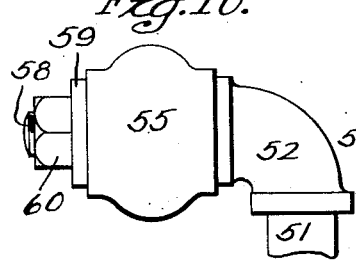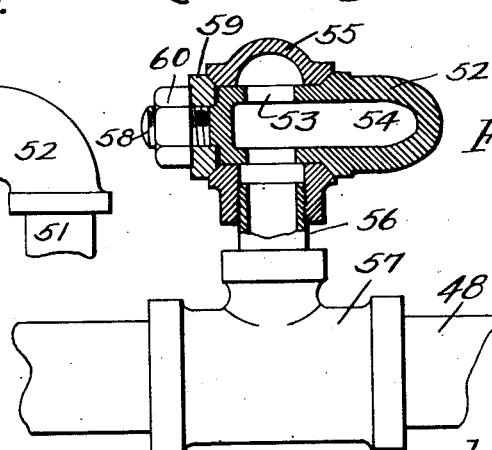

Patented Oct. 18, 1932

1,883,479

UNITED STATES PATENT OFFICE

FRED H. BATEMAN, OF GRENLOCH, NEW JERSEY, AND ISAAC TROLLEY, OF YORK, PENNSYLVANIA, ASSIGNORS TO FRED H. BATEMAN COMPANY, OF PHILADELPHIA, PENNSYLVANIA, A CORPORATION OF NEW JERSEY

POWER SPRAYER

Application filed April 27, 1929. Serial No. 358,559.

This invention relates to a power sprayer and is more particularly concerned with a new and improved manner of adjusting the booms thereof.

An object of the invention is to devise a power sprayer employing booms which are adjustably mounted with respect to the frame of the sprayer.

Another object is to devise a power sprayer employing booms adjustably mounted in such a way with respect to the frame of the sprayer that but little vibration occurs in the booms when they are in their operable position.

Another object is to devise a power sprayer in which the tank carries no part of the mechanism.

Another object is to devise a power sprayer in which substantially all of the mechanism is carried on the frame of the sprayer.

Another object is to devise a power sprayer employing a tank in which a portion of the tank is recessed for the reception of a motor.

Another object is to devise a power sprayer employing adjustable booms for spraying, having rope means for adjusting the angularity of the booms with respect to the horizontal.

Another object is to devise a power sprayer employing adjustable booms, and having means for locking the booms in their operable position.

Another object is to devise a power sprayer having a low center of gravity.

Another object is to devise a power sprayer employing either a model T or model A Ford motor.

Still another object is to devise a power sprayer having a pump mounted on the frame thereof and directly connected to a source of power.

Yet another object is to devise a power sprayer employing both side and top nozzles, the top nozzle being adjustably mounted.

Other objects will appear hereinafter.

In the drawings in which is illustrated one exemplification of my invention,

Fig. 1 is a perspective view of the complete device;

Fig. 2 is a perspective view of the supply tank proper;

Fig. 8 is an elevation of one of the nozzles used in the device;

Fig. 9 is a vertical section through Fig. 8;

Fig. 10 is an exterior view of one of the nipples employed in connection with the spray nozzles, permitting adjustment thereof; while Fig. 11 is a section through the detail shown in Fig. 10.

Figure 3:
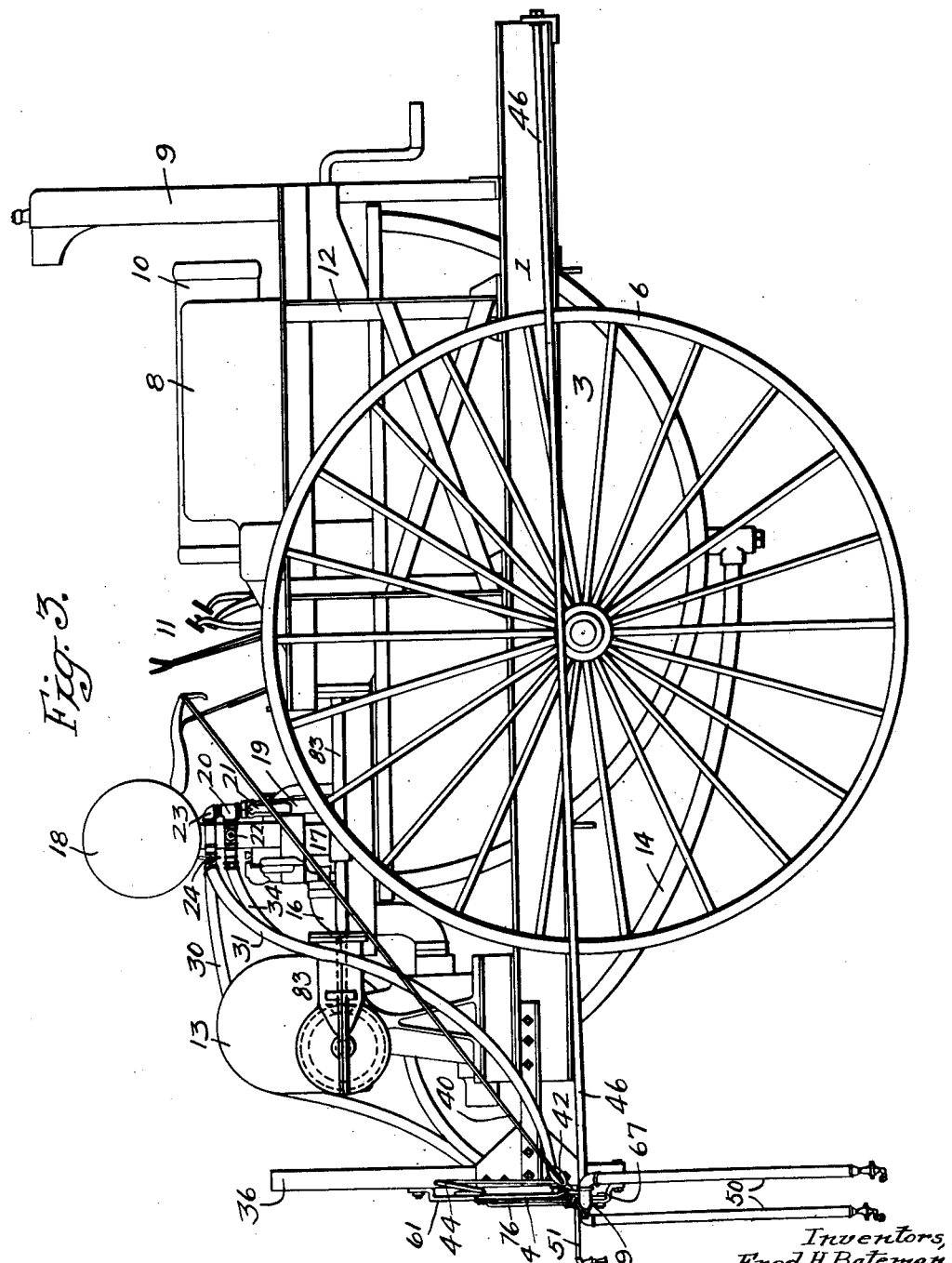
Fig. 3 is a side view thereof.
Figure 4:
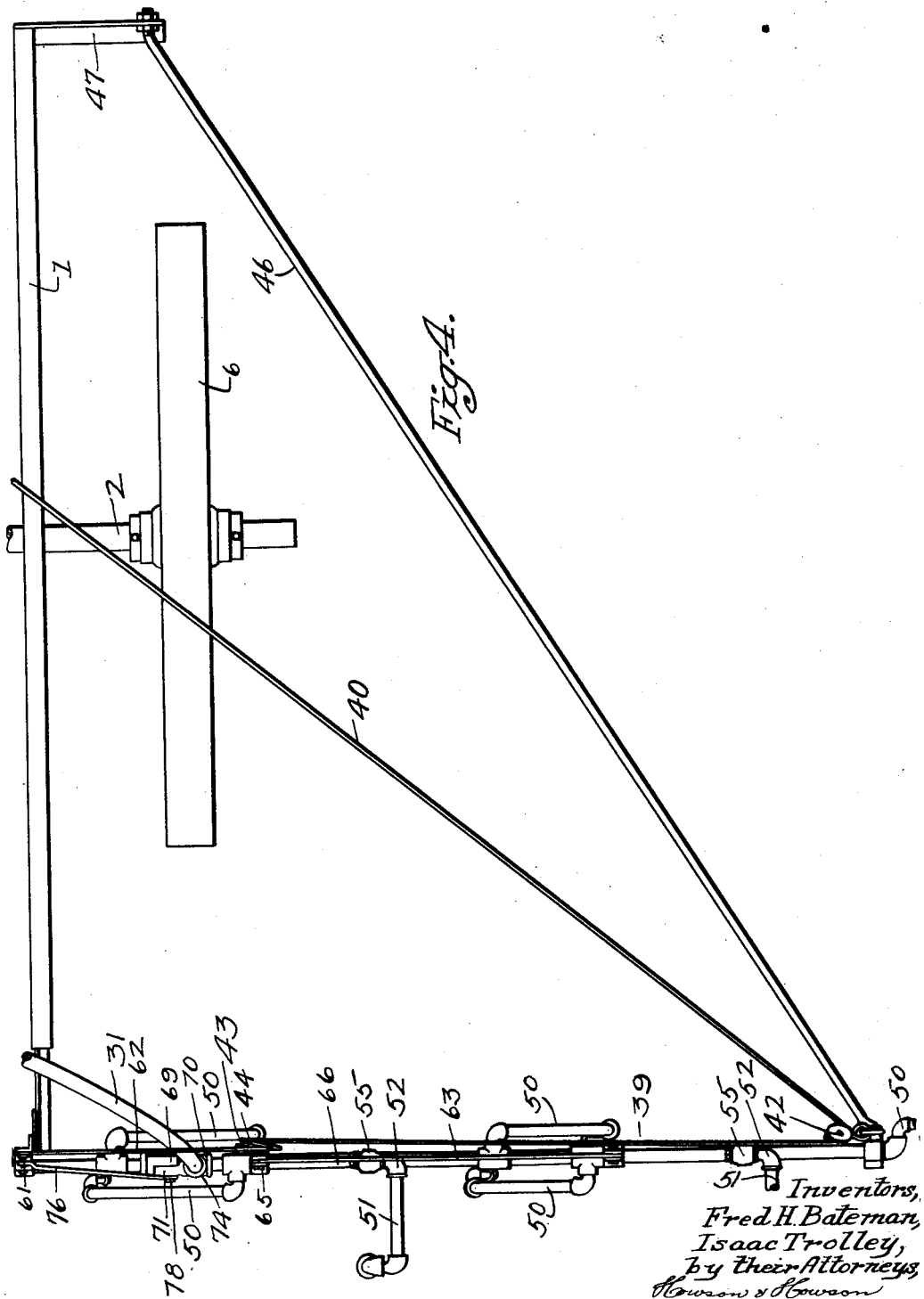
Fig. 4 is a plan view of a detail of the bracing means for the boom.
Figure 5:
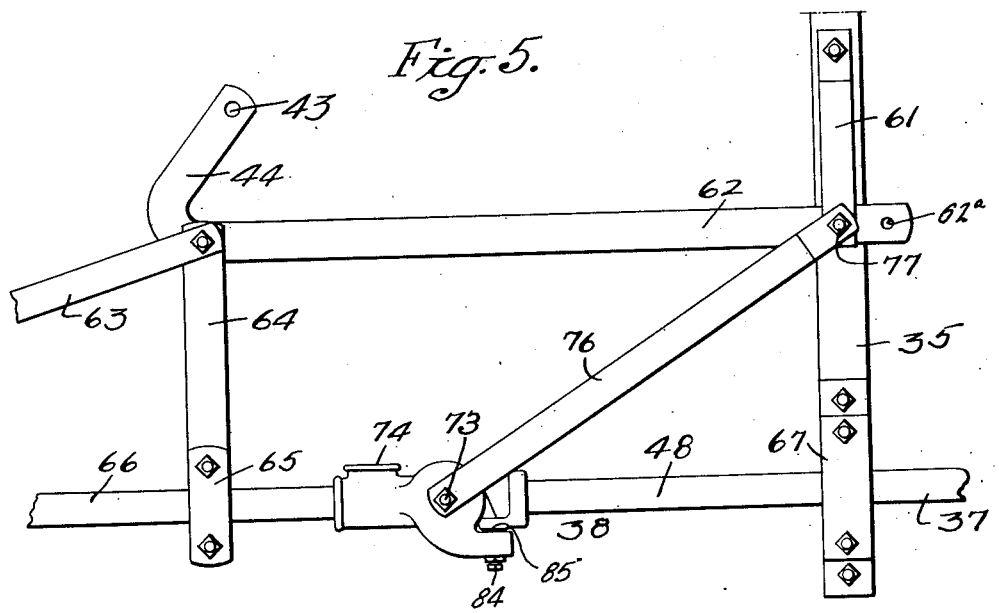
Fig. 5 is a detail of the locking means for one of the sections of the boom.
Figure 6:
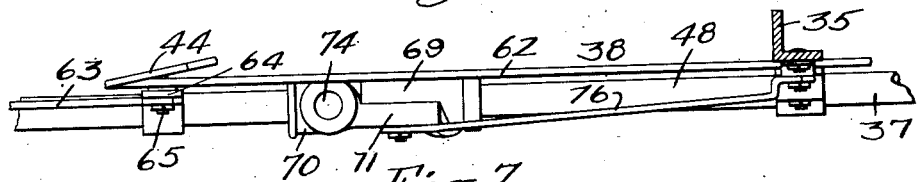
Fig. 6 is a plan view of a detail showing the connections of the center portion of the sprayer to one of the booms.

At 1 is shown a frame or chassis mounted directly on the axle 2 which, in turn, extends through and supports a container or tank 3 for the spray solution. While it is to be understood that the tank 3 may be of any conventional shape, it preferably has the semi-circular section shown in the drawings. The chassis or frame 1 is adapted to be equipped with a wagon-tongue 4, or is provided with any other suitable means for drawing the vehicle. The axle 2 is equipped with wheels 5 and 6 of relatively great width and which are mounted for limited adjustment on the axle. Thus an extremely large tractive surface is provided, in order to prevent miring in the soil over which the sprayer is drawn, while the distance between the wheels can be adjusted at will.

As shown in Fig. 2, the tank 3 is equipped with a recess 7 sunk into the top thereof for the reception of any suitable motor 8. In the present instance, the conventional model T—Ford motor is employed. By using a motor of such well known type, it is possible for the manufacturer to supply the rest of the apparatus with the exception of the motor with its attendant fuel supply tank, radiator, and drive shaft, and permitting the user to buy either a new or a second hand motor. Inasmuch as the Ford engines develop at least 22 H. P., while it is necessary to use, at the outside, no more than 10 H. P. in operating the sprayer, it is obvious that a rather dilapidated and hence inexpensive motor could be used for this purpose. Further, by the use of a motor of such widespread popularity, it is possible to service it with the least expenditure of time and money.

While, as stated, the motor 8 is seated in the recess 7, it is to be understood that it does not rest therein, but rather is mounted, along with the radiator 9, fuel supply tank 10, and auxiliary mechanism 11, on a suitable framework 12 which in turn, is mounted directly on the chassis or frame 1. Through a suitable direct transmission 83 the motor drives a pump 13 which forces the material from the tank 3 through the hose 14, to strainer 15, through the pump proper, and thence through a header 16 to a by-pass 17. At this point surplus pressure may be stored in the pressure head 18 while, when desired, the solution can be forced through pipe 19 to the T-connection 20. The pipe 19 is preferably provided with a control valve 21 while a suitable stop valve 22 is found in the leg portion of the T-connection 20. Connected in parallel with the member 20 on pipe 19 is an elbow 23 communicating with a two-way nozzle 24, the details of which are shown in Figs. 8 and 9. The nozzle comprises a central inlet 25 communicating by means of stop valves 26 and 27 with ports 28 and 29 which communicate respectively with hose connections 30 and 31. The stop valves 26 and 27 are respectively provided with adjusting handles 32 and 33 which, in connection with the stop valve 22, permit independent closure of any of the feed lines of the booms, to be hereinafter described. The T-connection 20 is adapted to supply a hose section 34. In the present instance, the pump 13 is directly mounted on the chassis or frame 1 while the header 16 is of such rigid construction that it supports the pressure head 18 and the mechanism related thereto.

Mounted on the rear portion of the frame 1 are upstanding posts 35 and 36, suitably cross-braced. These posts provide an adjustable mounting for supporting a boom comprised of a central boom 37 and adjustable wings or end booms 38 and 39. While the central boom 37 is fixed with regards to its horizontal plane, each of the end booms 38 and 39 are adapted to be swung through a vertical angle. In this manner, the booms are adaptable to be adjusted to any irregularities of the ground over which they pass; or when carrying the sprayer to and from the field of operation or over a roadway it is possible to swing both end booms to a vertical position and thus provide the necessary amount of clearance. This adjustability is accomplished in the present instance by means of a rope 40 connected to the seat 41, and adapted to pass over a pulley 42 mounted at the outside end of the respective booms 38 and 39, and attached at its other end at 43 to an eye formed in an arm 44 of the locking mechanism for the swinging booms 38 and 39. To insure the necessary rigidity to the booms 38 and 39 to prevent them from deteriorating as a result of the incessant shaking, they are reinforced at their extremities by suitable means such as rods or other reinforcing means 45 and 46 which are pivotally mounted at their inner or front ends on an extension 47 which, in turn is secured to the chassis or frame 1. The middle boom 37 comprises a pipe 48 to which the hose 34 is joined by a suitable connection 49. It will thus be seen that the pipe 48 is in the nature of a manifold, supplying the side nozzles 50 with a spraying solution or fluid from a pump 13. Also mounted on the manifold 48 and arranged midway between the members of the side nozzles 50 are top nozzles 51 which comprise an adjustable feature of considerable novelty, and which are also supplied by the manifold 48.

In the event that the sprayer passes over a potato bed in which the plants are of considerable height, it is desirable to spray the top of the plants by the top nozzles 51, at the same time spraying the plants adjacent the roots by means of the side nozzles 50. If, as is customary, the top sprayers 51 were not individually adjustable, it would be necessary to raise the entire boom on the arms 35 and 36 which, while it would bring the top nozzles into the desired position, would at the same time raise the side nozzles to such a height that they would not advantageously spray the boom of the plants.

By employing the adjustable nipple shown in Figs. 10 and 11, it is possible to adjust the top nozzles 51 through a vertical angle without regard to the side nozzles 50. If by any chance it is impossible to individually adjust the top nozzles 51 to a sufficient degree to accommodate for a particular sized plant, then it is possible to displace the boom in its entirety a small vertical distance and thus adjust the top sprayers to the desired point. The adjustable nipples before referred to each comprises a member 52 provided with an opening 53 admitting into an elongated channel 54, and adapted to be seated in a body portion 55 which at its lower end is threaded onto a nipple 56 forming part of a T-connection 57 on the supply line 48. The member 52 communicates at its outer end with the body portion of the top nozzles 51, and at its inner end is provided with a suitable threaded head 58 about which fit a lock washer 59 and a lock nut 60. In this manner, the top sprayers 51 are adaptable for angular adjustment.

Arranged on the arms 35 and 36 are bracket members 61, the lower ends of which provide keepers for latch members 62 which form part of the framework supporting the outer boom members 38 and 39. Pivotally secured to the outer portions of the members 62 of the diagonally extending arms 63 are the vertical arms 64 which terminate at their lower ends in clamp members 65 fitting tightly about pipe sections 66, each of which sections comprises the manifold for the outer boom portions 38 and 39. The arms 62 as shown terminate in upwardly extending portions 44 which receive at 43 the ropes 40, by means of which the pivotally mounted boom portions are lifted. A bracket 67 similar to bracket 61 is also provided on each of the arms 35 and 36 for the reception of the manifold 48. The manifolds 48 and 66 are pivotally secured together in any suitable manner.

The arms 62 are shown as provided with pins 62a which serve the function of acting as stops therefor, abutting against the side of the bracket 61. To adjust the booms so that they will extend horizontally when in their extended position, the lug portion 71 is provided with a set-screw 84 extending therethrough, and abutting against a bearing surface 85 provided on the lug portion 69. Adjustment of the screw 84 will vary the angular relation of the manifold 66 with respect to the manifold 48, and consequently will determine the position of the latch member 62 with respect to the bracket 61. When the manifold 66 is forced slightly upwardly, the arm 64 moves the member 62 towards the right. On the other hand, when the manifold 66 is forced slightly downwardly with respect to the manifold 48, the arms 62 will be moved to the left. This is of importance in securing the proper adjustment of the member 62 with respect to the bracket 61, so that as the boom is being lowered gently from its raised to its lowered position, the member 62 will seek its latched position with respect to the bracket 61.

Figure 7:
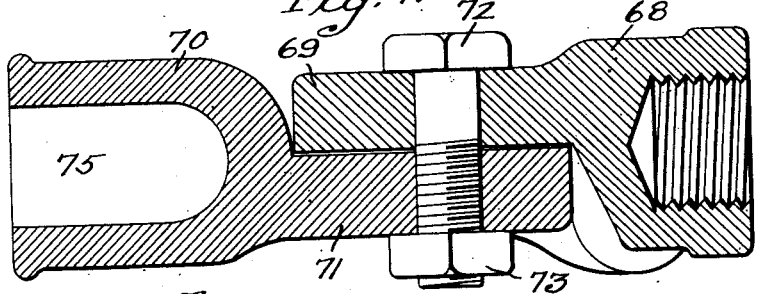
Fig. 7 is a detail of the joint shown in Fig. 5.
Figure 5A:
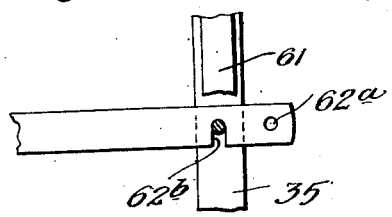
Fig. 5a is a fragmentary sectional view through the locking means.

As shown in Fig. 7, these means comprise a threaded portion 68 having a flattened lug portion 69 and a cooperating headed member 70 also having a flattened lug portion 71 for cooperation with the lug portion 69. The two portions 69 and 71 are secured together for pivotal movement by means such as a bolt 72 having a lock nut 73. The headed portion 70 in the present instance is provided with an orifice 74 for the reception of the hose lines 30 or 31 as the case may be, and communicates by means of channel 75 with the manifold 66. A link 76 is pivotally joined between the manifolds 48 and 66.

To properly agitate the solution in the tank 3, an endless chain 79 passes over a pulley 80 mounted on shaft 81 within the pump, and thence over an idler pulley 82, to the pulley 83, mounted on a suitable drive shaft within the tank 3.

An especially advantageous feature of our invention is that as a result of the separate means for cutting off the supply to each of the boom portions, it is possible to definitely determine the number of rows of plants being sprayed. Thus, if in a field where the main supply reservoir is located at one end thereof, it is possible, at one filling of the sprayer to spray a certain number of complete sets of rows, each set comprising in the present instance six rows of potatoes, two rows to each boom, and a fraction of an additional row, it will be seen that it will ordinarily be necessary to haul the empty sprayer from the point where it has been emptied back to the reservoir, and thence back again in its filled condition over the row which it had previously traversed in its empty condition, thus resulting in duplicate work.

By our device, it is possible to terminate the flow at will through any of the booms, thus permitting spraying in multiples of two or more rows or parts thereof, so that when it is obvious that it will not be possible for the sprayer to return to the other end of the field at which the sprayer is located, with all nozzles spraying, it will be necessary only to turn off the desired number of booms, permitting at least some of the rows to be sprayed throughout their length as the sprayer passes therethrough. After the sprayer has been refilled, the spraying operation will start at the rows next adjacent to those last sprayed, so that to a large extent, duplication of work will be avoided. The use of the booms, according to this scheme is also of much utility where the shape of the field is irregular, thus at times preventing the use of all the booms together.

It is of course understood that the invention is susceptible to numerous modifications and adaptations, and it is intended that it be limited only by the scope of the appended claims.

We claim:

1. In a power sprayer, a frame, upstanding posts mounted on said frame, a bracket on each of said posts, a collapsible linkage also mounted on each of said posts and adapted when in its extended position, to lock in said bracket, a plurality of spray booms mounted on said frame, and arranged end-to-end, the outer of said booms being adapted for adjustment through vertical angles and being retained by said link mechanism, the outer boom thus being locked when in a horizontal position, and an adjusting bolt at the inner end of each of said outer booms, abutting against a stop provided on the cooperating end of the adjacent boom, whereby the outer booms may be angularly adjusted in a slight degree with respect to the adjacent boom, at the same time producing a slight adjustment of the link mechanism with respect to their cooperating brackets.

2. In a sprayer, a spray boom pivoted to swing between operative and inoperative positions, means automatically latching the boom in its operative position when moved thereto and means for moving the boom from its operative to its inoperative position, initial operation of which releases said latching means.

3. In a sprayer, a stationary spray boom, a pivotal spray boom communicating therewith, a pin stationary with relation to the stationary boom, a link pivoted to the pivoted boom and having a notch for engagement with said pin when said pivoted and stationary booms are in a predetermined relation and means for moving the pivoted boom having connection with said link causing pivotal movement of the same upon initial application of pressure to move the pivotal boom from such position.

4. In a sprayer, a stationary spray boom, a pivotal spray boom communicating therewith, a pin stationary with relation to the stationary boom, a link pivoted to the pivoted boom and having a notch for engagement with said pin when said pivoted and stationary booms are in a predetermined relation, means for moving the pivoted boom having connection with said link causing pivotal movement of the same upon initial application of pressure to move the pivotal boom from such position, and co-acting stop means carried by the pivoted and stationary booms for determining such position.

FRED H. BATEMAN.
ISAAC TROLLEY.